(12) United States Patent
Johann et al.

(10) Patent No.: US 7,028,820 B2
(45) Date of Patent: Apr. 18, 2006

(54) HYDRODYNAMIC CLUTCH ARRANGEMENT WITH A CLUTCH DEVICE INSIDE THE CLUTCH HOUSING

(75) Inventors: Herbert Johann, Würzburg (DE);
Herbert Schmid, Münnerstadt (DE);
Fritz Leber, Friedrichshafen (DE)

(73) Assignee: ZF Friedrichshafen AG,
Friedrichshafen (DE)

( * ) Notice: Subject to any disclaimer, the term of this patent is extended or adjusted under 35 U.S.C. 154(b) by 3 days.

(21) Appl. No.: 10/811,554

(22) Filed: Mar. 29, 2004

(65) Prior Publication Data

US 2004/0216971 A1    Nov. 4, 2004

(30) Foreign Application Priority Data

Mar. 28, 2003    (DE)    ................ 103 14 331

(51) Int. Cl.
*F16H 45/00*    (2006.01)
(52) U.S. Cl. ............... 192/3.26; 192/3.3; 192/192; 192/3.33
(58) Field of Classification Search ............... 192/3.21, 192/3.25, 3.26, 3.28, 3.29, 3.3, 3.33
See application file for complete search history.

(56) References Cited

U.S. PATENT DOCUMENTS

| | | | | |
|---|---|---|---|---|
| 2,019,745 A | * | 11/1935 | Swennes | .................... 192/3.26 |
| 3,384,209 A | | 5/1968 | Murphy | |
| 3,537,262 A | | 11/1970 | Briski | |
| 3,820,417 A | * | 6/1974 | Allen et al. | .................... 475/65 |
| 3,893,551 A | * | 7/1975 | Ahlen | ................ 192/3.33 |
| 5,699,887 A | * | 12/1997 | Kundermann | ............. 192/3.26 |
| 6,019,202 A | | 2/2000 | Anwar | |
| 2001/0007383 A1 | * | 7/2001 | Schmid | .................... 267/286 |
| 2004/0050640 A1 | | 3/2004 | Schmid | |
| 2004/0188208 A1 | * | 9/2004 | Leber | ................ 192/3.25 |
| 2004/0188209 A1 | * | 9/2004 | Leber | ................ 192/3.25 |

FOREIGN PATENT DOCUMENTS

GB    2121489 A    * 12/1983

* cited by examiner

*Primary Examiner*—Richard M. Lorence
(74) *Attorney, Agent, or Firm*—Cohen, Pontani, Lieberman & Pavane (57) ABSTRACT

A hydrodynamic clutch arrangement is provided with at least a pump wheel and a turbine wheel to form a hydrodynamic circuit in a clutch housing, the drive-side wall of the housing being connected on the side facing the drive unit, such as an internal combustion engine, to the drive unit, a clutch device being provided to bring the housing into or out of working connection with the pump wheel. The clutch device is located inside the clutch housing.

31 Claims, 6 Drawing Sheets

Fig. 5
III-III

HYDRODYNAMIC CLUTCH ARRANGEMENT WITH A CLUTCH DEVICE INSIDE THE CLUTCH HOUSING

BACKGROUND OF THE INVENTION

1. Field of the Invention

The invention pertains to a hydrodynamic clutch arrangement having a pump wheel and a turbine wheel which form a hydrodynamic circuit in a clutch housing. The housing has a drive-side wall connected to a drive unit such as an internal combustion engine, and a clutch device is provided to bring the housing into and out of working connection with the pump wheel.

2. Description of the Related Art

A hydrodynamic clutch arrangement of this type is known from U.S. Pat. No. 6,019,202. It consists of a hydrodynamic torque converter equipped with a pump wheel, a turbine wheel, and a stator to form a hydrodynamic circuit inside a clutch housing. The drive-side housing wall of this clutch housing, i.e., the side of the housing which faces the drive unit, which can be an internal combustion engine, is connected to the drive unit, whereas the takeoff side, i.e., the side facing a gearbox, accepts a clutch device, which makes or breaks the working connection between the clutch housing and the pump wheel.

When equipped with a clutch device such as this, the hydrodynamic clutch arrangement becomes especially suitable for use in machines such as dredging shovels, because these machines require a combination of both traveling and lifting movements, the lifting movement pertaining to the shovel. Thus, by the at least partial disengagement of the clutch device, the transmission of the torque introduced by the drive unit to the pump wheel and thus to the hydrodynamic circuit can be reduced, so that only a residual torque leaves the hydrodynamic clutch arrangement on the takeoff side and is transmitted to the following gearbox. The result is that only a minimal amount of torque is available for the machine's travel, whereas most of the torque supplied by the drive unit can be made available to any desired branching point which allows the shovel to be lifted. Under these operating conditions, it is obvious that the bridging clutch, which is provided as part of the object of the US patent and which is mounted between the clutch housing and the turbine wheel, is released to prevent the torque supplied by the drive unit from being transmitted to the gearbox.

If, however, there is no need to lift the shovel and the main goal is to drive the machine, the clutch device is engaged, so that the torque which has been introduced into the clutch housing, as is conventional practice in hydrodynamic torque converters, can be transmitted either via the hydrodynamic circuit or via the bridging clutch to the gearbox.

U.S. Pat. No. 6,019,202 does not disclose the design of the clutch device, but the drawings allow the conclusion that, although the clutch device acts between the clutch housing and the pump wheel, it is not integrated into the clutch housing. As can also be seen in FIG. 1 of this patent, a separate hydraulic pressure circuit for engaging and disengaging the clutch device must be provided. As a result, the hydrodynamic clutch arrangement becomes complicated in design and also inefficient with respect to energy consumption. In addition, it must be assumed that the arrangement will occupy more than a little space, which should be avoided, even in the case of heavy machines.

SUMMARY OF THE INVENTION

The invention is based on the task of designing a hydrodynamic clutch arrangement with a clutch device between a clutch housing and a pump wheel in such a way that the desired functionality is obtained with a simple design in a minimum of space and also in such a way that a high degree of energy efficiency is ensured.

This task is accomplished according to the invention by the features stated in the characterizing clause. By integrating the clutch device into the clutch housing, a separate housing for the clutch device can be completely eliminated, which is especially advantageous because, first, a housing for a clutch device must be built with sufficient strength to withstand the high pressures which can prevail under certain conditions within this housing, and, second, because extensive sealing measures must be taken to prevent permanently the escape of the hydraulic medium which creates the required pressure. Because the clutch housing of a hydrodynamic clutch arrangement such as a hydrodynamic torque converter or a hydroclutch must already be designed in any case to withstand high pressures and is also already provided with the necessary sealing measures, there is no need take any extra measures for the sake of the clutch device—measures which would increase the overall complexity of the arrangement. It also especially advantageous that the clutch device can now be connected to the same pressure supply system as that to which, for example, the hydrodynamic circuit or possibly a bridging clutch are connected. In this respect as well, therefore, very little in the way of extra effort is required in comparison with a hydrodynamic clutch arrangement without a clutch device of this type.

The clutch device can be integrated into the clutch housing in an especially advantageous manner by connecting a control chamber, located axially between a clutch piston of the clutch device and a takeoff-side housing wall of the clutch housing, to the pressure supply system in such a way that the pressure in the control chamber is either the same as the positive pressure in the hydrodynamic circuit, this pressure then being exerted on the corresponding side of the clutch piston, or essentially zero. As long as the pressure in the control chamber is essentially the same as that in the hydrodynamic circuit, the clutch piston is exposed to the same pressure on both sides and thus, in practical terms, is disengaged, because, in this operating state it cannot exert any force on the transmission area of the clutch device, which, for example, is realized in the form of a multi-disk clutch. Nor are any sealing measures required between the hydrodynamic circuit and the control chamber during this type of operation, because, when the pressures are equal, there cannot be any significant shift in the transport medium between the hydrodynamic circuit and the control chamber.

After the pressure in the control chamber has been reduced essentially to zero by the switching function of the pressure supply system, the positive pressure now present on the side of the hydrodynamic circuit will exert load on the piston in the direction of the previously mentioned multi-disk clutch, so that, as a result of the high pressure per unit area prevailing in the friction area of the disks, the friction surfaces themselves will provide a sufficient sealing function, especially when at least one of the friction surfaces resting flat against another is provided with a friction lining. But even in the case that either the friction surface and/or the opposing friction surface has openings such as grooves to allow the passage of transport medium so that the friction surfaces can be cooled, the volume of fluid passing in this way through the multi-disk clutch represents only a residual leakage flow, which is unable to make any significant change in the pressure relationships between the hydrodynamic circuit and the control chamber, and the loss can be easily made up by the fresh transport medium being supplied to the hydrodynamic circuit.

In the previously described design of the clutch device, the maximum pressure which the pressure supply system is called upon to supply to the control chamber does not exceed the pressure in the hydrodynamic circuit. As a result, both the cost of the pump and also the need for sealing measures remain within the same limits as those which apply in any case to the pressure supply system for the hydrodynamic circuit.

Inventive sealing measures are proposed for cases in which the previously mentioned residual leakage through the multi-disk clutch, especially when the friction surfaces are provided with openings, is to occur along the entire radial extent of the friction surfaces. Thus, for example, it is possible to separate the control chamber in a pressure-tight manner from the hydrodynamic circuit by means of seals in the radially inner area and in the radially central or radially outer area of the clutch piston; it is also possible, however, to provide the clutch piston with flow channels in a radial area outside the seals, which channels are in flow connection with the openings provided in the friction surfaces. In this way, a flow of limited spatial extent can develop, which ensures a limited flow of viscous transport medium through the openings in the friction surfaces, this flow being dependent on any possible pressure differences in the flow area.

Various designs for the clutch device are possible. First, the clutch piston can be connected nonrotatably but with freedom of axial movement to the pump wheel hub, and it can also carry tie elements, which serve as a disk carrier for the multi-disk clutch. It is also possible to imagine a design in which the tie elements acting as a disk carrier are attached to the pump wheel shell, and in which the piston is mounted nonrotatably but with freedom of axial movement on a takeoff-side housing hub of the clutch housing. In both variants, the piston is connected nonrotatably but with freedom of axial movement, preferably by means of axially oriented teeth, to the same supporting component to which a seal for the pressure-tight separation of the hydrodynamic circuit from the control chamber and an axial stop to limit the range of axial movement of the piston can be attached. Both the seal and the axial stop are preferably located in the area of the base of the clutch piston. This design can be supplemented by an axial spring, which is supported at one end against the axial stop and at the other end against the clutch piston, which is thus always held under a light pretension, which pushes the piston toward the multi-disk clutch. Thus the axial spring makes sure that the piston is always in contact with the multi-disk clutch, which ensures not only that the disks are in continuous working connection with each other but also that the last disk on the takeoff side is in continuous contact with the adjacent takeoff-side clutch wall. This design makes it absolutely certain that the clutch piston remains in a clearly defined position even during the operating phases in which the pressure in the control chamber is the same as that in the hydrodynamic circuit.

In another embodiment, the advantages of the clutch are used specifically to facilitate the cold starting of the drive unit. Because the clutch is closed by the internal pressure of the converter, the clutch is open when in the pressureless state, i.e., when the drive unit is stopped. The drive unit can be started up without the resistance of the hydrodynamic converter, because the pump wheel is motionless when the clutch is open. Once the drive unit has reached sufficiently high rpm's, the converter is filled with oil, as a result of which an internal pressure builds up, which automatically closes the clutch and thus drives the pump wheel. The clutch will thus continue to transmit torque until the opposing pressure on the other side of the piston reaches the internal pressure of the converter and separates the connection between the drive unit and the pump wheel.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
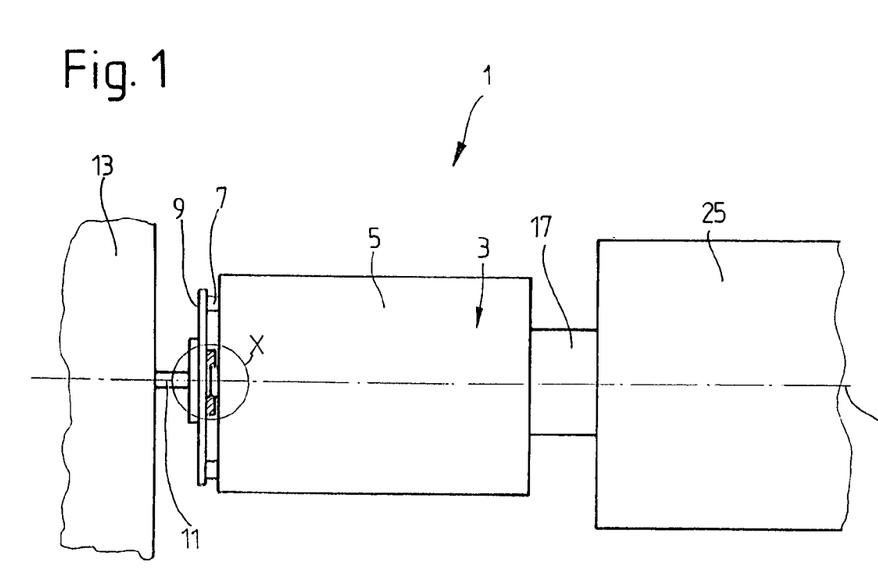
FIG. 1 shows a schematic diagram of a drive train with a drive unit, a clutch arrangement, and a gearbox.
Figure 2:
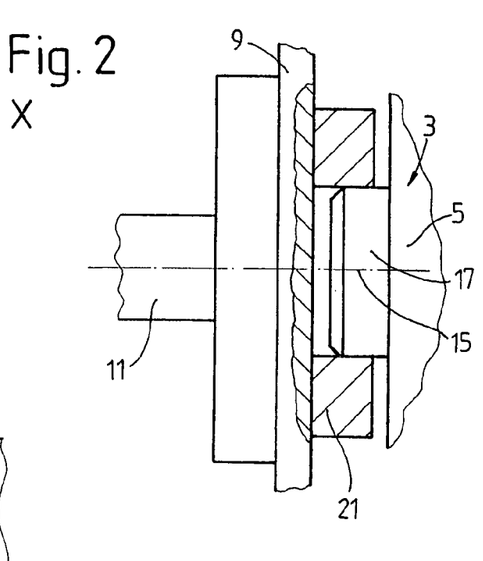
FIG. 2 shows a magnified view of the detail marked "X" in FIG. 1.

FIG. 1 is a schematic diagram, which shows a drive train 1 with a clutch arrangement 3 according to the invention. The clutch arrangement 3 comprises a clutch housing 5, which can be connected by a plurality of fastening elements 7 and a connecting element 9 such as a flexplate to a drive unit 11, such as the crankshaft of an internal combustion engine 13, for rotation in common. As clearly shown in FIG. 2, it also has a bearing journal 17 on the axis of rotation 15, which journal is formed on a drive-side housing hub 19 (FIG. 3) and is received in a centering guide 21, formed on the drive unit 11. On the axial side facing away from the drive unit 11, the clutch housing 5 according to FIG. 3 has a takeoff-side housing hub 23, which turns a fluid transport pump (not shown) by way of a gear wheel 27. A power takeoff element 29, the free end of which projects into the clutch housing 5, is located concentrically to the takeoff-side housing hub 23. This takeoff element 29 can be, for example, a gearbox input shaft 31 of a gearbox 25 (FIG. 1).

Figure 3:
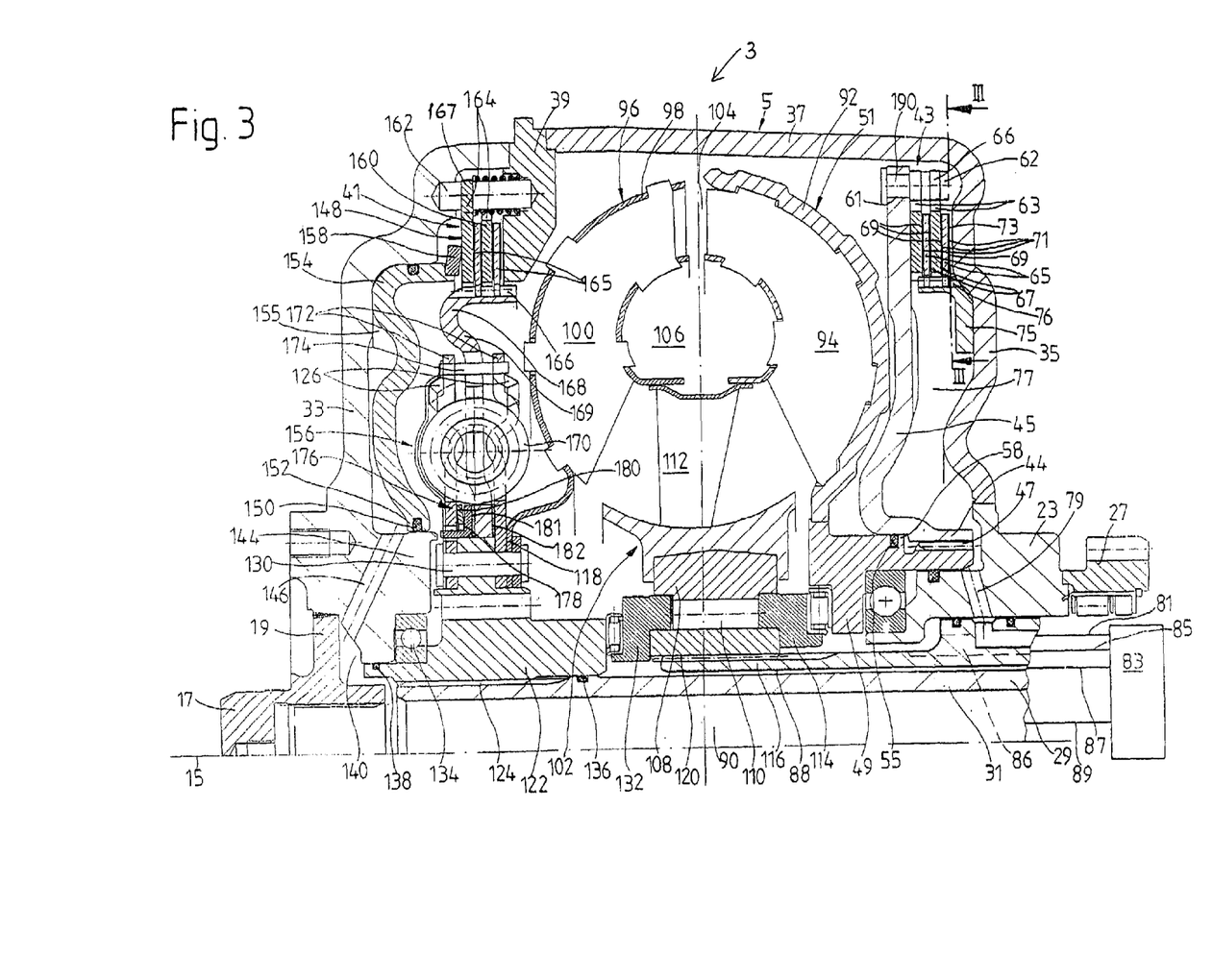
FIG. 3 shows a longitudinal cross section through a clutch arrangement with a clutch device equipped with a clutch piston, where the piston accepts a tie element, which serves as a disk carrier for the disks of a multi-disk clutch.

The clutch housing 5 has a drive-side housing wall 33, which proceeds essentially in the radially outward direction from the drive-side housing hub 19, and a takeoff-side housing wall 35, which proceeds essentially in the radially outward direction from the takeoff-side housing hub 23. In the radially outer area of the takeoff-side housing wall 35, there is a housing outer shell 37, which connects the two housing walls 33, 35 to each other axially. This outer shell is attached by way of an abutment 39 for a bridging clutch 41, to be described in greater detail below, to the drive-side housing wall 33.

As can be derived from FIG. 3, the clutch arrangement 3 has a clutch device 43, equipped with a clutch piston 45, inside the clutch housing 5. The base 44 of clutch piston 45 is connected to the pump wheel hub 49 and thus also to the pump wheel 51 nonrotatably but with freedom of axial movement by a set of teeth 47, formed between the clutch piston base 44 and the pump wheel hub 49 of the pump wheel 51. In the area where the clutch piston base 44 extends, axially adjacent to the set of teeth 47, an axial stop 58 is provided on the pump wheel hub 49 for the clutch piston 45 in order to limit the previously mentioned freedom of axial movement of the clutch piston 45. In addition, acting radially between the clutch piston base 44 and the pump wheel hub 49, a seal 55 is recessed into the pump wheel hub 49; this seal 55 ensures the required pressure tightness of the spaces located on both sides of the clutch piston 45. The space facing the pump wheel 51 is part of a hydrodynamic circuit 104, and the space between the opposite side of the clutch piston 45 and the adjacent, takeoff-side housing wall 35 is referred to as the control chamber 77.

Figure 5:
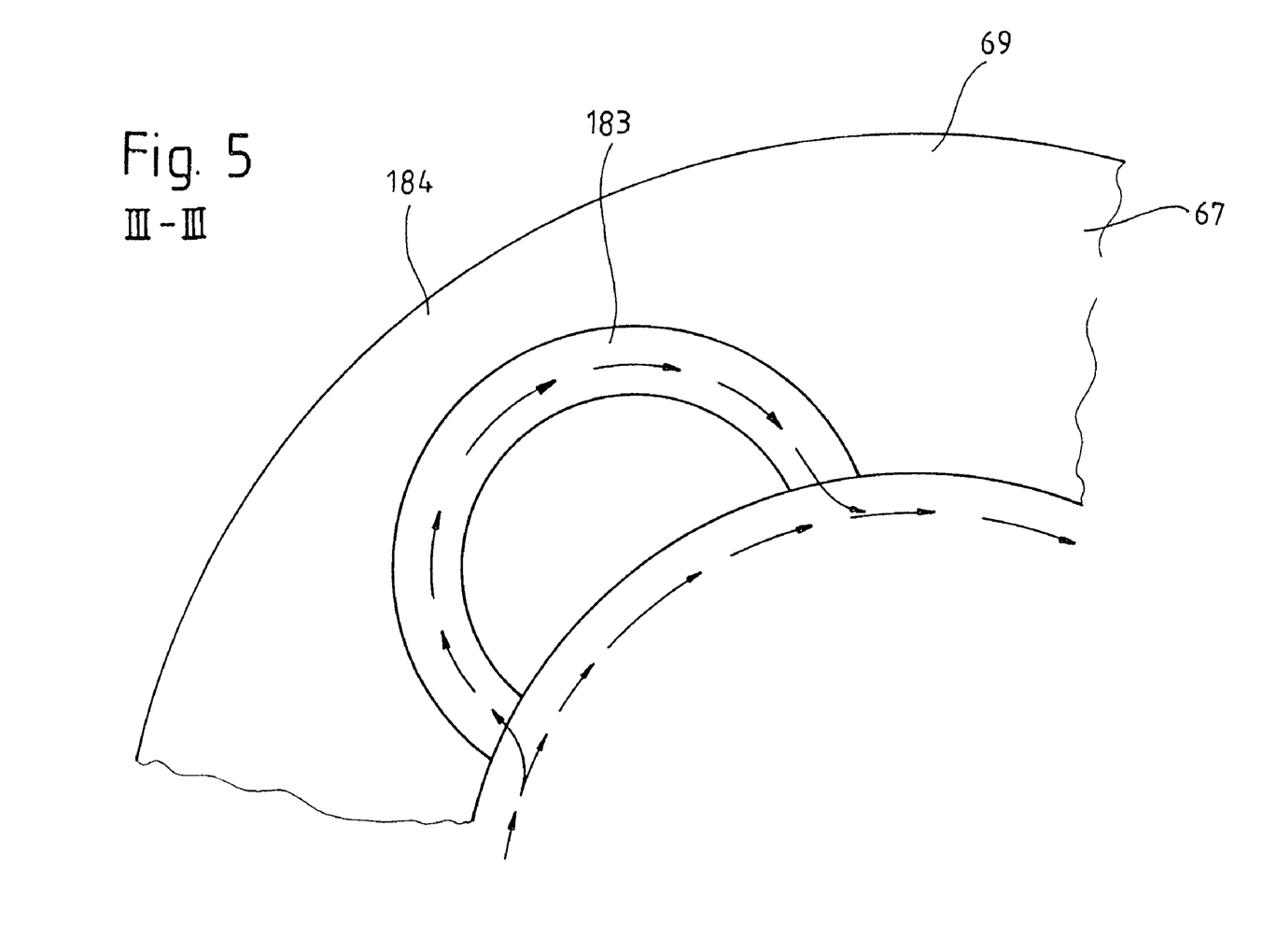
FIG. 5 show a friction area of the clutch device of FIG. 3 along line III—III.

The clutch piston 45 has a plurality of bores 61 in the radially outer area; each of these bores serves to accept a pin-like tie element 190. These pins take over the function of an outer disk carrier 62 for the outer disks 63, which can be brought into working connection with inner disks 65; together, the inner and outer disks form a multi-disk clutch 66. At least the inner disks 65 are in this exemplary embodiment equipped with friction linings 67 on both sides, which thus form friction surfaces 69. These friction surfaces cooperate with opposing friction surfaces 71 on the outer disks 63 and on the takeoff-side housing wall 35. The last friction surface 69 on takeoff side engages with the opposing friction surface 71 on the takeoff-side housing wall 35 at least when the clutch device 43 is engaged, that is, when the clutch piston 45 has been moved as far as possible toward the takeoff-side housing wall 35. In this way, the friction surfaces 69 of the multi-disk clutch 66 in conjunction with the opposing friction surfaces 71 take over the function of a radially outer seal 73 for the control chamber 77, especially when the friction linings 67 are provided only in the radially inner area with groove-like openings 183, as shown in FIG. 5, for the passage of viscous transport medium, which serves as a coolant, whereas, in the other radial area, i.e., the radially outer area in the present example, they have a lining part 184 which is free of interruptions in the circumferential direction.

To return to the multi-disk clutch 66, the inner disks 65 are connected nonrotatably by sets of teeth 76 to a bracket, serving as an inner disk carrier 75, which is attached to the takeoff-side housing wall 35.

The control chamber 77 is walled off in an essentially pressure-tight manner on the drive side by the clutch piston 45, which acts as a separating wall; radially on the outside by the multi-disk clutch 66; and, in the direction toward the gearbox, by the takeoff-side housing wall 35. Therefore, only the radially inner area of the control chamber 77 is left to provide a connection to a pressure supply system 83, which is indicated only schematically in the figure. For this purpose, bore-like connections 79 are present in the takeoff-side housing hub 23, which lead to a first control line 81, which is connected to the pressure supply system 83.

The clutch device 43 functions in the following way:

A torque transmitted by the drive unit 11 to the clutch housing 5 is to be transmitted to the pump wheel 51 by the engagement of the clutch device 43. For this purpose, the pressure supply system 83, acting by way of the first control line 81 and the connection 79, provides a pressure level in the control chamber 77 which is below the pressure level in the hydrodynamic circuit 104. The control chamber 77 can preferably have a pressure of zero in this case, that is, essentially atmospheric pressure. The clutch piston 45 is pressed by the action of the higher pressure in the hydrodynamic circuit 104 toward the takeoff-side housing wall 35, thus exerting a sufficient amount of force on the disks 63, 65 of the multi-disk clutch 66 present between it and this housing wall 35 to transmit the required torque. The torque present at the clutch housing 5 and thus at the inner disk carrier 75 is transmitted to the inner disks 65 and from these via the outer disks 63 and the outer disk carrier 62 to the clutch piston 45, which then transmits the torque via the teeth 47 on the base 44 of the clutch piston to the pump wheel hub 49.

To disengage the clutch device 43, the pressure supply system 83 supplies a pressure through the first control line 81 which is essentially the same as that in the hydrodynamic circuit 104, so that, via the connections 79, the control chamber 77 is also under this same pressure. There is thus no longer a defined pressure difference acting on the clutch piston 45, as a result of which the forces acting between the disks 63, 65 of the multi-disk clutch 66 are only strong enough to allow a very weak drag torque to be transmitted in the previously described manner via the multi-disk clutch 66 to the clutch piston 45 and from the piston to the pump wheel hub 49.

Of course, the pressure supplied to the control chamber 77 via the first control line 81 and the connections 79 by the supply system 83 could also be between the two previously mentioned extreme values.

Figures 7, 9:
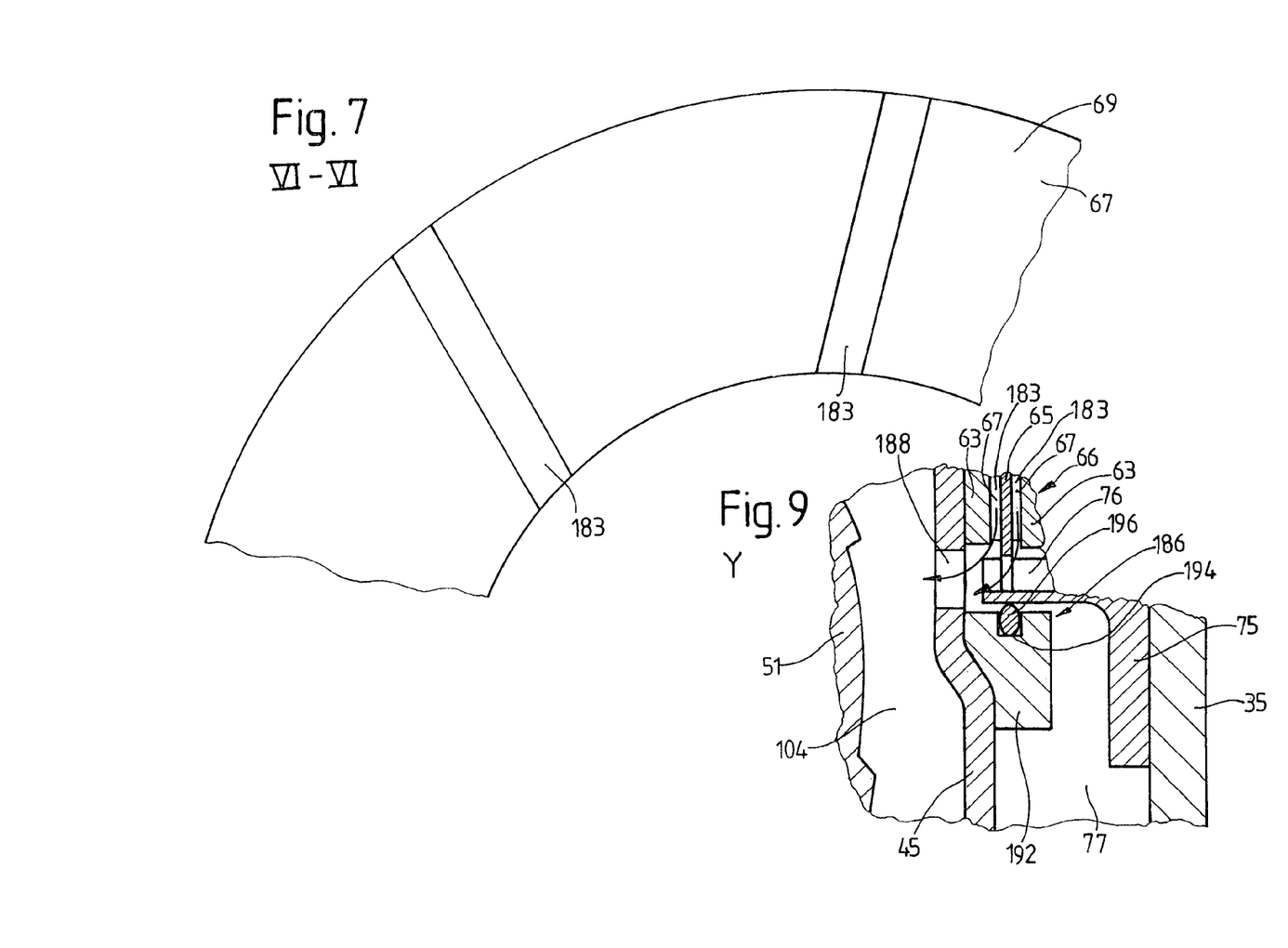
FIG. 7 shows a friction area of the clutch device of FIG. 6 along the line VI—VI.
FIG. 9 shows an enlarged view of the detail "Y" in FIG. 6.

If the friction surfaces 69 and the opposing friction surfaces 71 become quite hot as a result of severe slippage in the area of the multi-disk clutch 66, it is also conceivable that the friction linings 67 according to FIG. 7 could be provided with openings 183 which extend all the way across the radial dimension of the friction linings 67 and thus of the friction areas 69. If the friction linings 67 are designed in this way, however, it must be anticipated that there will be a limited flow of fluid from the hydrodynamic circuit 104 into the control chamber 77 when the pressure in the control chamber is lower than that in the hydrodynamic circuit 104, but this flow, which represents only "residual leakage" in comparison with the flow volume in the hydrodynamic circuit 104, can be easily compensated by the supply of fresh viscous transport medium to the hydrodynamic circuit 104. With respect to the clutch device 43 itself, this design does not lead to any disadvantages, because, when the clutch device 43 is engaged, this residual leakage entering the control chamber 77 can easily leave via the connections 79 and return to the pressure supply system 83, which means that the required pressure difference between the two sides of the clutch piston 45 remains preserved, whereas, when the clutch device 43 is disengaged, there is no need for a sealing function in the first place because of the equal pressures on both sides of the clutch piston 45.

Figure 4:
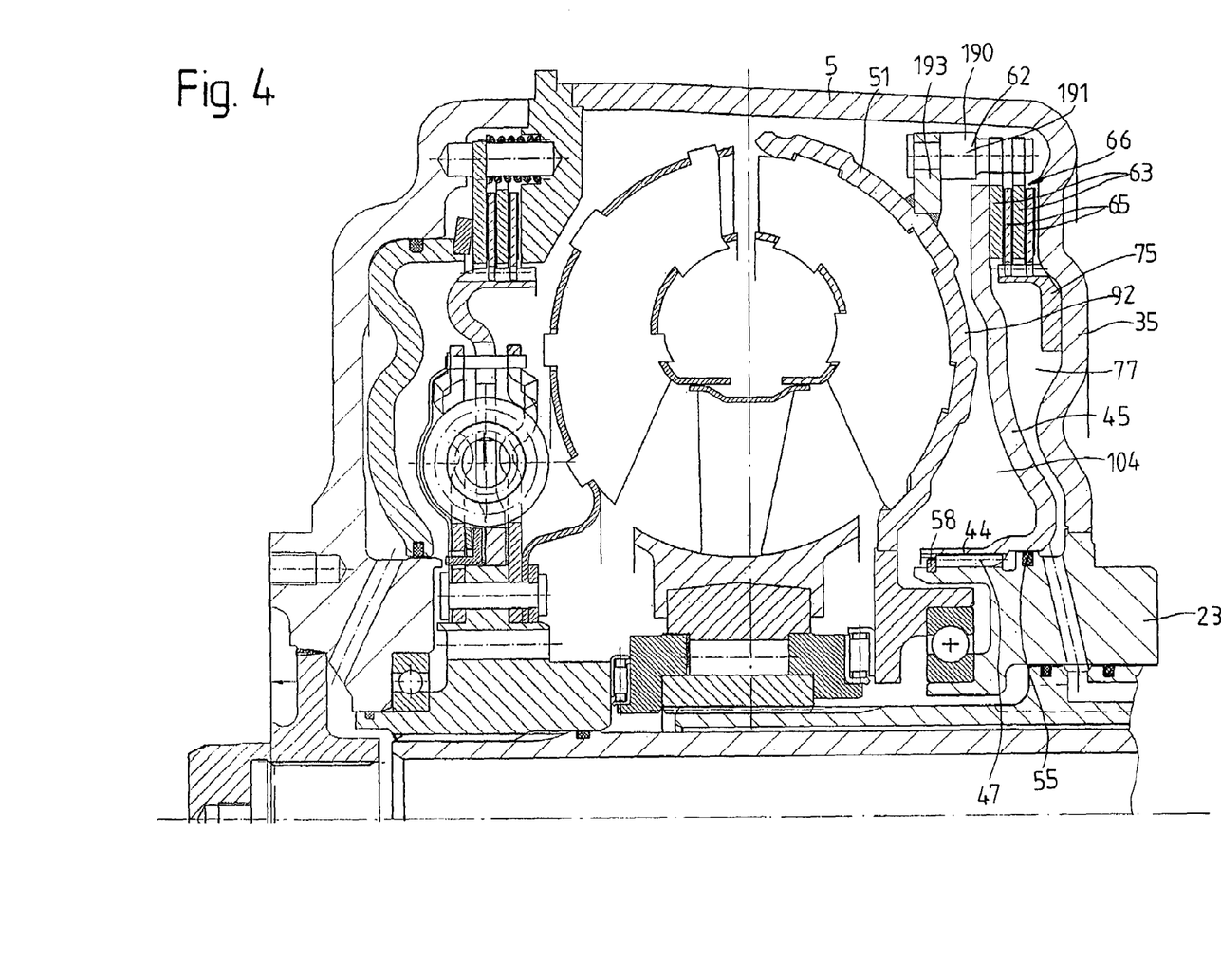
FIG. 4 is similar to FIG. 3, except that the tie element serving as disk carrier is attached to a pump wheel of the clutch arrangement.

Before the remaining part of the inventive hydrodynamic clutch arrangement 3 is explained in the following, brief mention should be made of additional embodiments of the inventive clutch device 43. Thus FIG. 4 shows a design in which the clutch piston 45 is mounted on the takeoff-side housing hub 23 by means of the teeth 47, which prevent the clutch piston 45 from rotating but allow it to move axially via its base 44. In this design as well, an axial stop 58 for limiting the axial travel of the clutch piston 45 and a seal 55 between the hydrodynamic circuit 104 and the control chamber 77 are provided.

Radially on the outside, the tie elements 190, serving as the disk carrier 62, are provided on the pump wheel 51, specifically on the shell 92 of the pump wheel. In contrast to the design according to FIG. 3, however, the tie elements 190 consist here of several parts, namely, a connecting stub 193 attached to the pump wheel shell 92, and a pin 191, mounted in the stub. The outer disks 63 of the multi-disk clutch 66 engage with the pin, so that, in this design as well, the tie elements 190 act as an outer disk carrier 62. In the manner previously described, the inner disks 65 are connected nonrotatably to the inner disk carrier 75, which is attached to the takeoff-side housing wall 35.

In this design, a torque present at the clutch housing 5 is transmitted via the inner disk carrier 75, the disks 66, 63, and the outer disk carrier 62 to the pump wheel 51. In the same way as in the design according to FIG. 3, the pressure in the control chamber 77 can be varied between the pressure level of the hydrodynamic circuit 104 and a pressureless state.

Figure 6:
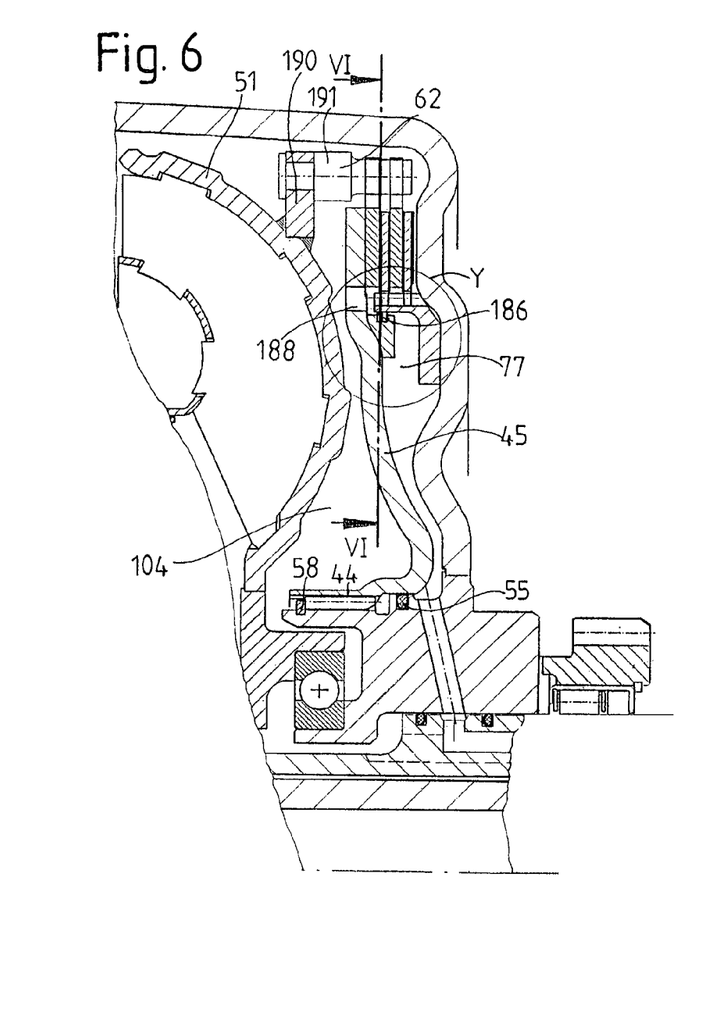
FIG. 6 is similar to FIG. 4, except that it shows sealing measures in the radially central and radially inner areas of the clutch piston.

The design of the clutch device 43 shown in FIG. 4 is elaborated in FIG. 6. Here, as the enlarged detail in FIG. 9 shows, a radially outer seal 186 is provided in the central radial area of the clutch piston 45, by means of which seal the control chamber 77 is sealed off against the hydrodynamic circuit 104. This seal 186 can also allow an operating mode in which a pressure higher than that present in the hydrodynamic circuit 104 is applied to the control chamber 77 to disengage the clutch device 43. So that the clutch device 43 can be engaged, the pressure in the hydrodynamic circuit 104 can be either equal to that in the control chamber 77 or less than that in the control chamber 77. Radially outside the seal 186, flow channels 188 are provided in the clutch piston 45, which make possible a compact flow circuit passing through the radially continuous openings 183, shown by way of example in FIG. 7, without the occurrence of any residual leakage into the control chamber 77.

As FIG. 9 shows, the seal 186 has a seal carrier 192 attached to the clutch piston 45. This carrier has a recess 194 in which a seal 196 is held, which is in contact with the inner disk carrier 75 and thus provides a sealing action. At the same time, as the arrows appearing in FIG. 9 indicate, medium can also flow through the openings 183 provided in the friction linings 67.

Figure 8:
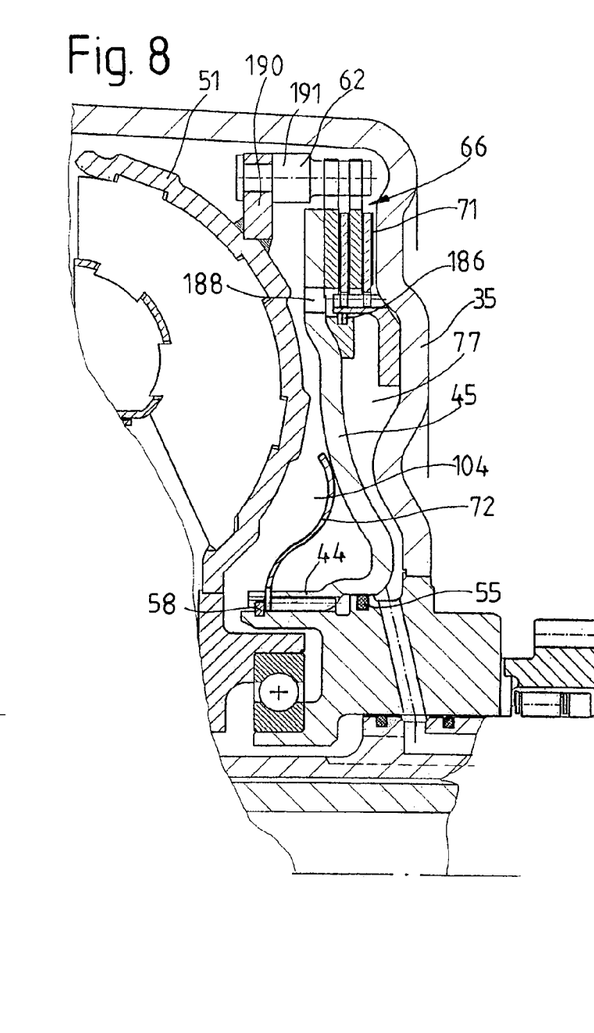
FIG. 8 is similar to FIG. 6, except that it shows an axial spring on the clutch piston.

FIG. 8 also shows this design, although in conjunction with an axial spring 72, which exerts a slight, continuous pretensioning force on the clutch piston 45 regardless of the pressure difference between the hydrodynamic circuit 104 and the control chamber 77 and thus holds the piston in an axial position in which contact is always ensured between the clutch piston 45 and the takeoff-side housing wall 35 via the friction surface 71 of the multi-disk clutch 66.

To return to FIG. 3, the structure and function of the hydrodynamic circuit 104 and of the bridging clutch 41 will also be described in greater detail.

To begin with the pressure supply 83, a second control line 85, which leads to the axial bores 86, is also provided in the same component in which the first control line 81 is provided, namely, in the support shaft 116. These axial bores are offset circumferentially from the first control line 81, and are therefore indicated in broken line. The support shaft 116, which is designed as a hollow shaft, surrounds the gearbox input shaft 31, which has a set of teeth 124 by which it holds a turbine hub 122 so that it cannot rotate but can move in the axial direction. The gearbox input shaft also engages nonrotatably by a set of teeth 120 with the freewheel 110 of a stator 102. Radially inside the support shaft 116, a ring-shaped channel 88 remains between the support shaft and the gearbox input shaft 31, and a third control line 87 leads to this ring-shaped channel 88. A fourth control line 89 leads to a central bore 90 situated inside the gearbox input shaft 31. Each of the control lines 85, 87, 89, like the control line 81, is connected to the pressure supply system 83, so that, via the control lines 85, 87, 89, the pressure supply system can supply the remaining parts of the clutch arrangement 3 with pressure and with fresh viscous transport medium.

The pump wheel 51, the pump wheel shell 92 of which is provided with pump wheel vanes 94, cooperates with a turbine wheel 96, equipped with a turbine wheel shell 98 and turbine wheel vanes 100. The pump wheel 51 also cooperates with a stator 102. The pump wheel 51, the turbine wheel 96, and the stator 102 form the hydrodynamic circuit 104 in the conventional manner and enclose an internal torus 106.

The stator vanes 112 of the stator 102 are mounted on a stator hub 108, which is mounted on the previously mentioned freewheel 110. The latter is supported axially against the pump wheel hub 49 by an axial bearing 114, which is provided with flow channels (not shown), and against the turbine hub 122 by a similar axial bearing 132; a turbine wheel base 118 and two cover plates 126 are attached to the radially outer area of the turbine hub by rivets 130. The turbine hub 122 itself is supported by an axial bearing 134 against a drive-side housing wall hub 144 of the drive-side housing wall 33. Radially on the inside, the turbine hub 122 is sealed off against the gearbox input shaft 31 by a seal 136, and radially on the outside it is sealed against the drive-side housing wall hub 144 by a seal 138.

Transport medium which has entered via the central bore 90 of the gearbox input shaft 31 arrives in a transition space 140, located between the drive-side housing hub 19 and the drive-side housing wall hub 144. From there, the medium proceeds via channels 146 in the housing wall hub 144 radially outward to a chamber 155, which is located axially between the drive-side housing wall 33 and a piston 154 of the previously mentioned bridging clutch 41. The piston 154 is centered on the drive-side housing wall 33, and the side of this piston which faces away from the chamber 155 faces the hydrodynamic circuit 104 and can be moved as a function of the pressure relationships in the hydrodynamic circuit 104 and in the chamber 155 back and forth between two different axial limit positions in order to engage and disengage the bridging clutch 41. The piston 154 can be moved in the axial direction by its base 152, which is supported on the housing wall hub 144; a piston seal 150, embedded in the piston base 152, seals the base off against the housing wall hub 144. The radially outer area of the piston 154 is also sealed and comes elastically to rest against a pressure plate 167 by way of a disk spring 158.

The pressure plate 167, like the intermediate plate 160, is mounted nonrotatably on pins 162, which are attached to the drive-side housing wall 33 and to the abutment 39; these disks thus act as the outer disks 164 of a multi-disk clutch 148, which also has inner disks 165, each of which is connected by sets of teeth 166 to the hub disk 168 of a torsional vibration damper 156. This hub disk 168, which acts as an input damper part 169 of the torsional vibration damper 156, is in working connection via a set of circumferential springs 170 with the previously mentioned cover plates 126, the latter serving as the output damper part 172 of the torsional vibration damper 156. Stops 174 limit the degree to which the input damper part 169 and the output damper part 172 can rotate relative to each other. In addition, a friction device 176 with a friction element 178 is present, which element is connected for rotation in common with the drive-side cover plate 126 of the input damper part 169 and is held in contact with the hub disk 168 of the output damper part 172 by an axial spring 180, this axial spring 180 being located in the contact area between the drive-side cover plate 126 and the friction element 178. The friction element 178 can be supported against a friction surface 181 on the hub disk 168, which comes to rest in turn, under the action of the axial spring 180, against the takeoff-side cover plate 126 by way of an additional friction surface 182.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A hydrodynamic clutch arrangement comprising:
    a clutch housing having a drive-side wall for connecting to a drive unit and a takeoff-side wall for connecting to a gearbox;
    a pump wheel in the housing;
    a turbine wheel in the housing, the turbine wheel and the pump wheel forming a hydrodynamic circuit in the housing; and
    a clutch device located inside the housing, the clutch device bringing the housing into and out of working connection with the pump wheel, wherein the clutch device comprises a separating wall having a first side facing the hydrodynamic circuit and a second side facing the takeoff-side wall of the housing, a control chamber between the second side and the takeoff-side wall, and a first control line connected to a pressure supply system, wherein the hydrodynamic circuit has a prevailing pressure and the pressure supply system selectively supplies the control chamber with a control pressure which is essentially the same as the prevailing pressure.

2. A hydrodynamic clutch arrangement as in claim 1 comprising a clutch piston which is not rotatable with respect to the housing, the clutch piston forming the separating wall.

3. A hydrodynamic clutch arrangement as in claim 1 wherein the pressure supply system can switch the pressure in the control chamber between the control pressure and a residual pressure which is less than the control pressure.

4. A hydrodynamic clutch arrangement as in claim 3 wherein the residual pressure is essentially the same as atmospheric pressure.

5. A hydrodynamic clutch arrangement as in claim 2 wherein the clutch piston comprises at least one seal for sealing the hydrodynamic circuit from the control chamber.

6. A hydrodynamic clutch arrangement comprising:
    a clutch housing having a drive-side wall for connecting to a drive unit and a takeoff-side wall for connecting to a gearbox;
    a pump wheel in the housing;
    a turbine wheel in the housing, the turbine wheel and the pump wheel forming a hydrodynamic circuit in the housing;
    a clutch device located inside the housing, the clutch device bringing the housing into and out of working connection with the pump wheel, wherein the clutch device comprises a separating wall formed by a clutch piston which is not rotatable with respect to the housing, the separating piston having a first side facing the hydrodynamic circuit and a second side facing the takeoff-side wall of the housing, the clutch device further comprises a control chamber between the second side and the takeoff-side wall, and a first control line connected to a pressure supply system, wherein the clutch piston comprises at least one seal for sealing the hydrodynamic circuit from the control chamber and the seal allows a predetermined residual leakage between the hydrodynamic circuit and the control chamber.

7. A hydrodynamic clutch arrangement comprising:
    a clutch housing having a drive-side wall for connecting to a drive unit and a takeoff-side wall for connecting to a gearbox;
    a pump wheel in the housing;
    a turbine wheel in the housing, the turbine wheel and the pump wheel forming a hydrodynamic circuit in the housing;
    a clutch device located inside the housing, the clutch device bringing the housing into and out of working connection with the pump wheel, wherein the clutch device comprises a separating wall formed by a clutch piston which is not rotatable with respect to the housing and having a first side facing the hydrodynamic circuit and a second side facing the takeoff-side wall of the housing, a control chamber between the second side and the takeoff-side wall, and a first control line connected to a pressure supply system; and
    at least one friction surface which can be urged toward the takeoff-side housing wall by the clutch piston, the at least one friction surface acting as a seal between the hydrodynamic circuit and the control chamber.

8. A hydrodynamic clutch arrangement as in claim 7 further comprising at least one friction lining, each said friction lining forming a respective said friction surface.

9. A hydrodynamic clutch arrangement as in claim 8 wherein each said friction lining has a first radial area provided with openings which allow the flow of coolant, and a second radial area which is essentially free of interruptions in the circumferential direction.

10. A hydrodynamic clutch arrangement as in claim 8 wherein each said friction lining is provided with openings to allow flow of coolant, the openings extending across the lining in the radial direction.

11. A hydrodynamic clutch arrangement as in claim 10 further comprising a seal located radially inside the at least one friction lining, the seal acting between the clutch piston and the takeoff-side housing wall.

12. A hydrodynamic clutch arrangement as in claim 11 further comprising at least one through channel located radially inside the friction lining and radially outside the seal.

13. A hydrodynamic clutch arrangement as in claim 11 further comprising at least one disk provided with at least one friction lining, the clutch piston cooperating with the at least one disk.

14. A hydrodynamic clutch arrangement as in claim 13 wherein said clutch device is a multi-disk clutch having a plurality of disks arranged axially, said disks comprising said at least one disk having at least one friction lining.

15. A hydrodynamic clutch arrangement as in claim 14 further comprising:
- an outer disk carrier which is fixed to one of said pump wheel and said clutch piston, the multi-disk clutch comprising at least one outer disk which is connected to the outer disk carrier non-rotatably but with freedom of axially movement; and
- an inner disk carrier fixed to the takeoff-side housing wall, the multi-disk clutch comprising at least one inner disk which is connected to the inner disk carrier non-rotatably but with freedom of axially movement.

16. A hydrodynamic clutch arrangement as in claim 15 wherein the seal is provided between the second side of the clutch piston and the inner disk carrier.

17. A hydrodynamic clutch arrangement as in claim 16 further comprising a seal carrier fixed to the clutch piston, the seal carrier having a recess in which the seal is held.

18. A hydrodynamic clutch arrangement as in claim 14 further comprising at least one flow channel provided in at least one friction surface of at least one disk of the multi-disk clutch.

19. A hydrodynamic clutch arrangement as in claim 15 wherein the takeoff side of the housing and the pump wheel each comprise a hub, the outer disk carrier being connected nonrotatably to one of the pump wheel and the clutch piston, the clutch piston being connected nonrotatably to one of the hubs.

20. A hydrodynamic clutch arrangement as in claim 19 wherein the outer disk carrier is connected nonrotatably to the clutch piston, the clutch piston being connected nonrotatably to the pump wheel hub.

21. A hydrodynamic clutch arrangement as in claim 19 wherein the clutch piston has a radially inner area comprising a base having axial teeth which connect the base nonrotatably but with freedom of axial movement to said one of said hubs.

22. A hydrodynamic clutch arrangement as in claim 19 wherein the takeoff-side housing hub is provided with an axial stop which limits axial travel of the clutch piston toward the pump wheel.

23. A hydrodynamic clutch arrangement as in claim 22 further comprising an axial spring which pretensions the clutch piston toward the takeoff-side housing wall, the axial spring being supported against the axial stop.

24. A hydrodynamic clutch arrangement as in claim 19 further comprising a radially inner seal between the clutch piston and the one of the hubs.

25. A hydrodynamic clutch arrangement as in claim 1 wherein the takeoff-side housing wall comprises a hub having connections for connecting the control chamber to the pressure supply system.

26. A hydrodynamic clutch arrangement as in claim 1 further comprising a bridging clutch for bypassing said hydrodynamic circuit.

27. A hydrodynamic clutch arrangement as in claim 26 wherein said bridging clutch comprises a torsional vibration damper.

28. A hydrodynamic clutch arrangement as in claim 1 wherein the clutch device can be closed by hydraulic pressure within the clutch housing.

29. A hydrodynamic clutch arrangement as in claim 1 wherein the clutch device does not transmit any torque when the hydraulic pressure on the separating wall is that same as that in the control chamber.

30. A hydrodynamic clutch arrangement as in claim 1 wherein the clutch device is opened when the drive unit is started.

31. A hydrodynamic clutch arrangement as in claim 1 wherein the pressure in the control chamber can be automatically switched by the pressure supply system between the pressure present in the hydrodynamic circuit and a residual pressure which is lower than the pressure present in the hydrodynamic circuit, wherein the clutch device brings the housing into working connection with the pump wheel when the pressure in the control chamber is residual pressure and the clutch device brings the housing out of working connection with the pump wheel when the pressure in the control chamber is the control pressure.

* * * * *